United States Patent [19]

Hikawa

[11] Patent Number: 4,858,035
[45] Date of Patent: Aug. 15, 1989

[54] DIGITAL SIGNAL REPRODUCING SYSTEM

[75] Inventor: Kazuo Hikawa, Tokyo, Japan

[73] Assignee: Victor Company of Japan, Ltd., Japan

[21] Appl. No.: 105,442

[22] Filed: Oct. 1, 1987

[30] Foreign Application Priority Data

Oct. 2, 1986 [JP] Japan .................................. 61-234960

[51] Int. Cl.⁴ .............................................. G11B 5/09
[52] U.S. Cl. .................................................... 360/51
[58] Field of Search ..................... 360/51; 375/95, 116, 375/120; 328/109

[56] References Cited

U.S. PATENT DOCUMENTS 4,275,466  6/1981  Yamamoro ............................. 360/51
4,472,795  9/1984  Sugiyama et al. .
4,603,411  7/1986  Sugiyama et al. .

FOREIGN PATENT DOCUMENTS 3136423  3/1986  Fed. Rep. of Germany .

Primary Examiner—Vincent P. Canney
Attorney, Agent, or Firm—Lowe, Price, LeBlanc, Becker & Shur

[57] ABSTRACT

A digital signal reproducing system includes magnetic heads attached to a rotatable cylinder. The magnetic heads have different azimuth angles. The magnetic heads serve to reproduce a digital signal having signal blocks including sync signals. A counter counting clock signals and generating at least one timing signal in accordance with the count of the clock signals. A device processes the reproduced digital signal at a timing determined by the timing signal. During high tape speed reproduction for search, the counting operation of the counter is started when the sync signal is detected and is stopped when the count of the clock signals reaches a predetermined number.

5 Claims, 3 Drawing Sheets

DIGITAL SIGNAL REPRODUCING SYSTEM

BACKGROUND OF THE INVENTION

This invention relates to a digital signal reproducing system, such as a rotary-head digital audio tape system.

Rotary-head digital audio tape (R-DAT) recording and reproducing systems use rotary-heads to record and reproduce digital signals in and from magnetic tapes. Known R-DAT systems tend to be unreliable during high tape speed reproduction for search.

SUMMARY OF THE INVENTION

It is an object of this invention to provide a reliable digital signal reproducing system.

A digital signal reproducing system according to a first aspect of this invention includes magnetic heads attached to a rotatable cylinder. The magnetic heads have different azimuth angles from each other. The magnetic heads serve to reproduce a digital signal having signal blocks including sync signals. A counter counts clock signals and generates at least one timing signal in accordance with the count of the clock signals. A device processes the reproduced digital signal at a timing determined by the timing signal. During high tape speed reproduction for search, the counting operation of the counter is started when the sync signal is detected and is stopped when the count of the clock signals reaches a predetermined number.

A digital signal reproducing system according to a second aspect of this invention includes a rotatable cylinder and magnetic heads attached to the cylinder. The magnetic heads have different azimuth angles from each other. The magnetic heads serve to reproduce a digital signal having signal blocks including sync signals. A counter counts clock signals and generates at least one timing signal in accordance with the count of the clock signals. A device processes the reproduced digital signal at a timing determined by the timing signal. A device detects omission of the sync signal from the reproduced digital signal. During high tape speed reproduction for search, the timing signal is inhibited when omission of the sync signal from the reproduced digital signal is detected.

DESCRIPTION OF THE PREFERRED EMBODIMENT

Figure 1:
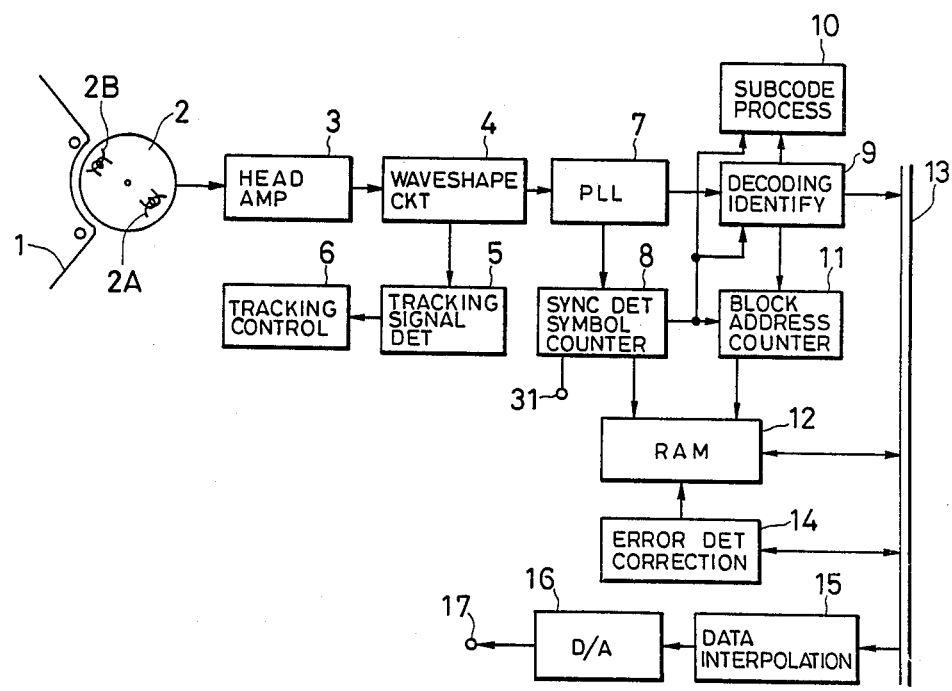
FIG. 1 is a block diagram of a digital signal reproducing system according to an embodiment of this invention.
Figure 2:
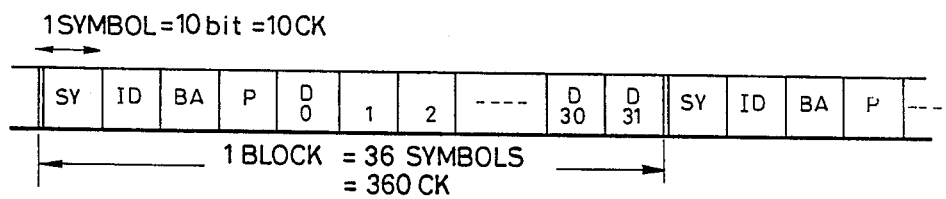
FIG. 2 is a diagram of a digital signal processed in the system of FIG. 1.

FIG. 1 shows a digital data reproducing system of this invention. FIG. 2 shows a formation of a one block of a digital signal processed by the digital data reproducing system of FIG. 1. Prior to the description of the digital data reproducing system of FIG. 1, the formation of the digital signal will be described with reference to FIG. 2.

As shown in FIG. 2, one block of the digital signal contains a sequence of a block sync signal (sync pattern) SY, a data identification code ID, a block address (sub-code:0-7/8-15 blocks, PCM:0-127 blocks) BA, a parity check portion (simply called "parity") P, and data (32 symbols) D0-D31. One block of the digital signal has 36 symbols. In each block of the digital signal, the parity P is generally determined in accordance with the data identification code ID and the block address BA. It should be noted that one symbol equals 10 bits or 10 CK.

With reference to FIG. 1, the digital signal reproducing system includes a rotary cylinder 2. Two magnetic heads 2A and 2B are mounted on the cylinder 2 so that they rotate together with the cylinder 2 and scan a magnetic tape 1. The rotary heads 2A and 2B reproduce respective digital signals from the magnetic tape 1. The two digital signals are combined into a single reproduced digital signal which is fed to a data decoding and identification circuit 9 via a head amplifier 3, a wave shape equalization circuit 4, and a phase-lock loop (PLL) circuit 7. The reproduced digital signal is also fed to a block address counter 11 via the PLL circuit 7 and a sync detection symbol counter 8 (hereinafter called "symbol counter"). The block address counter 11 determines a high-order part of writing address in a random access memory (RAM) 12 in accordance with a block address BA reproduced by the data decoding and identification circuit 9. The symbol counter 8 is synchronized by the detection of a block sync signal SY. The symbol counter 8 generates signal processing timing pulses to be applied to the data decoding and identification circuit 9, a subcode processing circuit 10, and the block address counter 11. These pulses are used in controlling timings of signal processing in the devices 9-11.

At the same time, the symbol counter 8 generates symbol address of data D0-D31 so that a low-order part of writing address in the RAM 12 is determined. The data decoding and identification circuit 9 changes serial data into corresponding parallel data, decoding modulated data into 8-bit forms and identifying data. The data identification code ID and the block address BA are subjected to parity check or parity calculation. When the result of parity check is positive, e.g., when the sum of P and ID or BA in each bit equals zero, the data identification code ID and the block address BA are transmitted to the subcode processing circuit 10 and the block address counter 11 respectively.

In a PCM (pulse code modulation) environment, the data D0–D31 are supplied from the data decoding and identification circuit 9 to a data bus 13 to be stored in the RAM 12. In a SUB area, the data D0–D31 are supplied from the data decoding and identification circuit 9 to the sub code processing circuit 10. The data stored in the RAM 12 are read out by an error detection and correction circuit 14 and are subjected to data detection and correction process in the device 14. The data processed by the error detection and correction circuit 14 are fed to a data interpolation circuit 15 via the data bus 13. When data correction is impossible, the data is subjected to an interpolation process such as a mean-value-interpolation process, or a preceding-value-holding process. The data outputted by the data interpolation circuit 15 are transformed by a digital-to-analog (D/A) converter 16 into an analog signal which is applied to an analog signal output terminal 17.

A tracking signal detection circuit 5 derives or detects a tracking signal from the output signal of the wave shape equalization circuit 4. A tracking control circuit 6 performs tracking control of the heads 2A and 2B with respect to the recorded tracks on the tape 1 in accordance with the tracking signal outputted by the tracking signal detection circuit 5.

Figure 3:
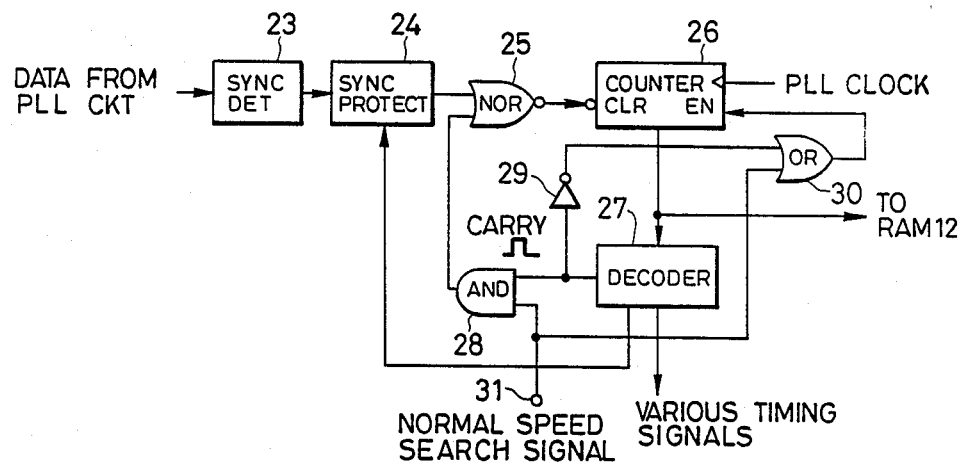
FIG. 3 is a block diagram of the symbol counter of FIG. 1.
Figure 4:
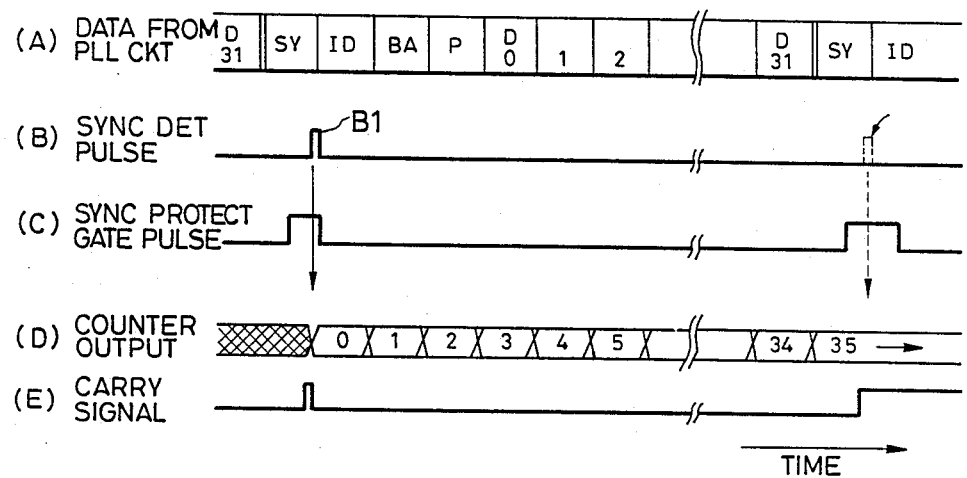
FIG. 4 consisting of a through E is a timing diagram of signals in the symbol counter of FIG. 3.

As shown in FIG. 3, the symbol counter 8 includes a sync detection circuit 23 receiving a parallel digital signal derived from serial data (see A of FIG. 4) outputted by the PLL circuit 7. The device 23 detects or derives a sync pattern and outputs a corresponding sync detection pulse signal (see B of FIG. 4). When data are reproduced accurately, sync detection pulses are outputted normally. When a sync pattern is absent from data due to a cause such as a dropout in the magnetic tape 1, no sync detection pulse is outputted. A sync protective circuit 24 generates a sync protective gate signal (see C of FIG. 4) in accordance with the sync detection pulse signal (see B of FIG. 4) and with a basic timing signal fed from a decoder 27. The timing of a sync protective gate pulse (see C of FIG. 4) is basically determined by the signal outputted from the decoder 27 to the sync protective circuit 24. The sync protection performed by the device 24 is to protect a counter 26 from phantom sync signals. A current sync protective gate pulse (see C of FIG. 4) is generated on the basis of a preceding sync detection pulse see B of FIG. 4). Only a sync detection pulse (see B of FIG. 4) occurring during a high-level duration of a sync protective gate pulse (see C of FIG. 4) is allowed to pass through the sync protective circuit 24. In this way, a timing of the detection of a subsequent sync pattern is anticipated, and phantom sync patterns occurring during periods except the anticipated timing are removed.

It should be noted that such sync protection is a known technology.

A sync detection pulse (see B of FIG. 4) from the sync protective circuit 24 is transmitted via a NOR gate 25 to the counter 26 as a counter clearing signal. An output signal from the counter 26 is applied to a decoder 27. The decoder 27 generates a carry signal (see E of FIG. 4) in accordance with the output signal from the counter 26. When sync patterns are detected normally from the reproduced digital signal, the carry signal is outputted at the same timing as the timing of the sync detection pulse signal. In cases where an AND gate 28 connected between the decoder 27 and the NOR gate 25 remains open, when a sync pattern is absent from the reproduced digital signal, a carry signal moves to the counter 26 through the gates 25 and 28 and thus forms an equivalent sync signal in place of a sync detection pulse so that synchronization can be maintained.

A terminal 31 is subjected to a normal speed and search signal which is generated in a known way. The normal speed and search signal assumes a high level state during reproduction at a normal speed and assumes a low level state during reproduction at a high speed for search. It should be noted that the digital signal reproducing system have various modes of operation including a normal speed reproduction mode and a high speed search reproduction mode which can be selected by the user manipulating a known means. The normal speed and search signal travels from the terminal 31 to the AND gate 28 and an OR gate 30. An output terminal of the OR gate 30 is connected to an enabling terminal EN of the counter 26. A carry signal output terminal of the decoder 27 is connected to the OR gate 30 via an inverter 29. A clock input terminal of the counter 26 is subjected to PLL clock signals outputted by the PLL circuit 7 (see FIG. 1). The output signal from the counter 26 is applied to an address input terminal of the RAM 12 (see FIG. 1). As described previously, the decoder 27 generates timing signals applied to the devices 9-11 (see FIG. 1). The decoder 27 is connected to the sync protective circuit 24.

During the normal speed reproduction where the normal speed and search signal is in the high level state, the enabling terminal EN of the counter 26 remains subjected to the high level signal fed via the terminal 31 and the OR gate 30 so that the counter 26 is allowed to count the PLL clocks. Accordingly, the decoder 27 normally generates the timing signals in accordance with the output signal from the counter 26 so that the reproduced digital signal can be processed by the devices 9-11 at normal timings. During the same period, the AND gate 28 remains opened so that a carry signal is allowed to move from the decoder 27 to the counter 26. Accordingly, even when a sync pattern is absent from the reproduced digital signal, a carry signal serves as a sync signal so that synchronization can be maintained.

During the high speed search reproduction where the normal speed and search signal is in the low level state, the AND gate 28 remains closed so that no carry signal is allowed to pass through the AND gate 28. Accordingly, the counter 26 is cleared or reset by only a sync detection pulse (see B of FIG. 4) fed from the sync protective circuit 24. During the same period, the output of the OR gate 30 equals an inversion of the carry signal generated by the decoder 27. The counter 26 is reset by a leading edge of a sync detection pulse (see B1 of FIG. 4). After the counter 26 is reset, the device 26 counts the PLL clock signals for a time interval corresponding to the length of one block as shown by D of FIG. 4. At the end of this time interval, an inversion of the carry signal (see E of FIG. 4) allows the enabling terminal EN of the counter 26 to be subjected to a low level potential so that the counting operation of the device 26 is interrupted as shown by D of FIG. 4. Thereafter, the output of the counter 26 remains absent or unchanged independent of the PLL clock signals and the carry signal remains in the high level state as shown by E of FIG. 4 until the counter 26 is reset by a later sync detection pulse fed from the sync protective circuit 24. When the counter 26 is reset by the later sync detection pulse, the carry signal returns to the low level state. The low level carry signal exposes the enabling terminal EN of the counter 26 to a high level potential so that the device 26 starts to count the PLL clock signal again.

In cases where carry signal pulses immediately precede sync detection pulses corresponding to successive signal blocks during the high speed search reproduction, the counter 26 is allowed to count the PLL clocks for each of intervals corresponding to the respective signal blocks, although the counter 26 is periodically suspended for an extremely short interval by an inversion of the carry signal.

In cases where carry signal pulses are essentially concurrent with sync detection pulses during the high speed search reproduction, the counter 26 is allowed to count the PLL clock signals for each of intervals corresponding to the respective signal blocks without being suspended by an inversion of the carry signal.

In cases where a sync pattern is absent from the reproduced data after the counting operation of the device 26 is interrupted during the high speed search reproduction, the carry signal (see E of FIG. 4) further continues to be in the high level state and thus the counter 26 further keeps suspended. Thus, during the high speed search reproduction, when a sync pattern is absent from the reproduced data by a dropout in the magnetic tape 1, the symbol counter 8 is suspended for an interval corresponding to one signal block so that the supply of timing signals to the devices 9-11 (see FIG. 1) is inhibited for the same interval. Accordingly, in the event of the dropout, unnecessary parity check, unreliable data decoding and identification are prevented. When a sync pattern appears normally again, the suspended counter 26 is reset by a sync detection pulse fed from the sync protective circuit 24 and thus the carry signal returns to the low level state. The low level carry signal exposes the enabling terminal EN of the counter 26 to a high level potential so that the device 26 restarts to count the PLL clock signals.

Figure 5:
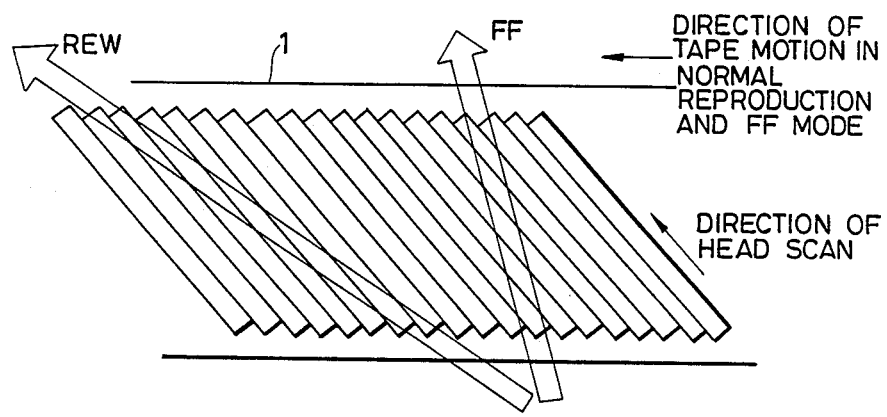
FIG. 5 is a diagram of lines of motion of the magnetic heads in FIG. 1 during high tape speed reproduction for search.
Figure 6:
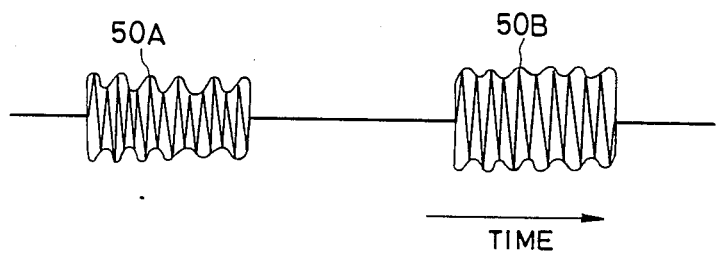
FIG. 6 is a diagram of a reproduced signal derived through the magnetic heads in FIG. 1 during high tape speed reproduction for search.

FIG. 5 shows lines of motion of the rotary heads 2A and 2B with respet to the tracks on the tape 1 during high speed search reproduction (fast forwarding operation "FF" and rewinding operation "REW"). As shown in FIG. 5, the rotary heads 2A and 2B scan tracks in the magnetic tape 1 along paths (denoted by large arrows) oblique to the tracks. In general, the two magnetic heads 2A and 2B have different azimuth angles so that data in tracks recorded by the first head 2A are selectively reproduced by the first head 2A and that data in tracks recorded by the second head 2B are selectively reproduced by the second head 2B. Accordingly, during the high speed search, a resultant of the output signals of the two magnetic heads 2A and 2B contains separate wave packets 50A and 50B as shown in FIG. 6 which are derived via the heads 2A and 2B respectively. In this way, during the high speed search, dropouts periodically occur even in digital data portions of the reproduced signal and thus sync patterns are sometimes omitted from the reproduced signal. During the occurrence of such a dropout, reproduced data are random and useless so that parity check is unnecessary. As described previously, during the occurrence of a dropout causing the omission of a sync pattern from the reproduced data, the symbol counter 8 is suspended to prevent unnecessary parity check.

Frequent occurrences of dropouts make it difficult to reproduce PCM audio data. Therefore, during the high speed search reproduction, only sub codes are reproduced and access is performed in accordance with contents of the reproduced sub codes. The sub codes are recorded in the both end regions of each track and are reproduced by use of data identification code ID, block address BA, and sub code data PACK in sub code regions. The data identification code ID and the block address BA are reproduced through simple parity. In addition, the sub code data PACK in the sub code regions is reproduced through simple parity, since many erroneous data occur and C1 parity tends to pass some of the erroneous data during the high tape speed search reproduction.

What is claimed is:

1. A digital signal reproducing system comprising:
   (a) a rotatable cylinder;
   (b) magnetic heads attached to the cylinder and having different azimuth angles, the magnetic heads being operative to reproduce a digital signal having signal blocks including sync signals;
   (c) a counter counting clock signals and generating at least one timing signal in accordance with the count of the clock signals;
   (d) means for processing the reproduced digital signal at a timing determined by the timing signal; and
   (e) means for, during high tape speed reproduction for search, starting the counting operation of the counter when the sync signal is detected and stopping the counting operation of the counter when the count of the clocks reaches a predetermined number.

2. The digital signal reproducing system of claim 1 further comprising means for, after the counting operation of the counter is stopped, restarting the counting operation of the counter when the sync signal is detected.

3. The digital signal reproducing system of claim 1 wherein the processing means comprises a data decoding and identification circuit and a block address counter.

4. A digital signal reproducing system comprising:
   (a) a rotatable cylinder;
   (b) magnetic heads attached to the cylinder and having different azimuth angles, the magnetic heads being operative to reproduce a digital signal having signal blocks including sync signals;
   (c) a counter counting clock signals and generating at least one timing signal in accordance with the count of the clock signals;
   (d) means for processing the reproduced digital signal at a timing determined by the timing signal;
   (e) means for detecting omission of the sync signal from the reproduced digital signal; and
   (f) means for, during high tape speed reproduction for search, inhibiting the timing signal when omission of the sync signal from the reproduced digital signal is detected.

5. The digital signal reproducing system of claim 4 further comprising means for, after the timing signal is inhibited, uninhibiting the timing signal when the sync signal is detected.

* * * * *